United States Patent
Ramsey

[11] 3,781,537
[45] Dec. 25, 1973

[54] BEZEL ASSEMBLY
[75] Inventor: Charles W. Ramsey, Niles, Ohio
[73] Assignee: General Motors Corporation, Detroit, Mich.
[22] Filed: Mar. 31, 1972
[21] Appl. No.: 240,187

[52] U.S. Cl................ 240/8.16, 240/8.2, 240/10 L
[51] Int. Cl............................................. B60q 3/04
[58] Field of Search.................. 240/8.16, 8.2, 10 L; 340/380; 40/11 R

[56] References Cited
UNITED STATES PATENTS
| | | | |
|---|---|---|---|
| 3,132,811 | 5/1964 | Madansky | 240/8.16 |
| 3,548,523 | 12/1970 | Laws | 40/11 R |
| 3,654,452 | 4/1972 | Frey | 240/8.16 |
| 2,673,924 | 3/1954 | Roper et al. | 240/8.16 |
| 3,077,535 | 2/1963 | Dupree | 240/8.16 |
| 3,231,951 | 2/1966 | Armond | 40/11 R X |
| 3,324,585 | 6/1967 | Frederickson | 40/11 R |

Primary Examiner—Samuel S. Matthews
Assistant Examiner—E. M. Bero
Attorney—Jean L. Carpenter et al.

[57] ABSTRACT

A bezel assembly for securing a fiber optic illuminated legend to an apertured panel includes a bezel insertable through the aperture from the front and carrying an arm which extends through the panel and a backup plate slidably insertable at the rear of the panel between the arm and the body of the bezel to lock the bezel in place. The backup plate carries an illuminable fiber optic ribbon and a legend bearing applique.

4 Claims, 5 Drawing Figures

PATENTED DEC 25 1973 3,781,537
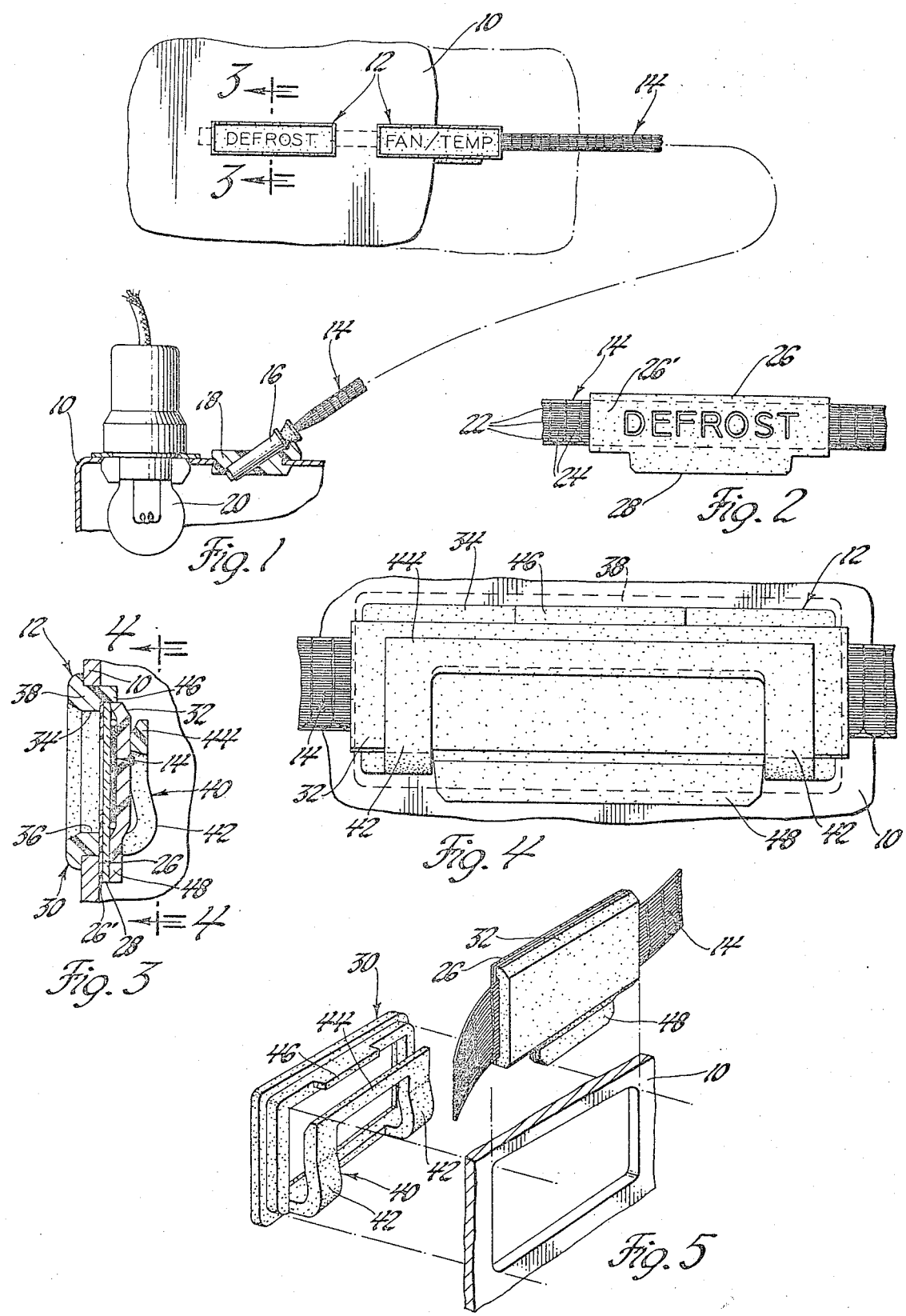

BEZEL ASSEMBLY

This invention relates to a bezel assembly for attachment to an aperture in a panel and more particularly to such an assembly carrying an illuminable legend.

It is often desirable to provide in an instrument panel of an automotive vehicle, for example, an illuminated legend. It is advantageous to illuminate the legend using fiber optics so that the lamp will be located remote from the legend in an area readily accessible for servicing. It is also desirable that a bezel assembly be easily attached to the panel and without the use of separate fasteners and without the use of tools.

It is therefore a general object of this invention to provide a bezel assembly comprising a bezel insertable in a panel aperture from a front face of the panel and a locking member insertable from the rear of the panel.

It is another object to provide such an assembly wherein the locking member carries a legend and a fiber optic illuminator for illuminating the legend.

It is a further object of the invention to provide a bezel assembly for attachment to a panel without the use of tools and without separate fasteners.

The invention is carried out by providing a bezel having a frame insertable through an aperture in the panel from the front face of the panel, a flange portion surrounding the aperture and an arm attached to the frame extending through the panel, and a backup plate slidably insertable between the arm and the rear of the panel for locking the bezel assembly in place. The invention further contemplates that the backup plate carry a fiber optic illuminator and a legend bearing applique such that when assembled, the legend is visible through the bezel opening.

The above and other advantages will be made more apparent from the following specification taken in conjunction with the accompanying drawings wherein like reference numerals refer to like parts and wherein:

FIG. 1 is a partly broken away view of an instrument panel carrying two bezel assemblies according to the invention and illuminated from a common light source by fiber optics;

FIG. 2 is an elevational view of a subassembly comprising a backup plate, a legend bearing applique and a fiber optic light conductor;

FIG. 3 is a cross-sectional view of the bezel assembly of FIG. 1 taken along lines 3—3;

FIG. 4 is a rear elevation view of the bezel assembly taken along lines 4—4 of FIG. 3; and, FIG. 5 is an exploded perspective view of a bezel assembly according to the invention.

As shown in FIG. 1, an instrument panel 10 carries two legend bearing bezel assemblies 12 illuminated by a common fiber optic ribbon light conductor 14 which terminates in a ferrule 16 supported in the panel 10 by a retainer 18 such that the end of the fiber optic element is aimed toward a lamp 20. The fiber optic ribbon 14 as better seen in FIG. 2 comprises a plurality of parallel fiber optic filaments 22 arranged in a flat ribbon-like form and woven into a unitary structure by transverse threads 24. As is well known, fiber optic light conductors comprise a plurality of filaments each having a core of transparent material having a high index of refraction and coated with a thin layer of material having a low index of refraction so that light entering an end of the filament is passed along by total internal reflection occurring at the boundary of the core and coating materials. While fiber optic conductors normally receive light at one end and emit light from the other end, they may be caused to emit light laterally of the ribbon by disturbing the coating of the individual filaments in selected areas where legend illumination is desired.

FIG. 2 further shows a translucent applique 26 mounted over the fiber optic ribbon 14. More specifically, the applique comprises a sheet of transparent or translucent material having formed on the face thereof a coating of opaque material defining the legend characters. The opaque coating is shown as 26' in FIG. 3. The applique is generally rectangular in shape with a lower central extension 28 depending therefrom, the extension having a length less than the length of the applique.

As seen in FIGS. 3, 4 and 5, the bezel assembly 12 includes a bezel 30 and a backup plate 32 that carries the fiber optic ribbon 14 and the applique 26. The bezel 30 comprises a generally rectangular frame 34 defining a window or opening 36 and having its outer dimension sized to snugly fit within the aperture of the panel 10. A flange 38 integral with the frame 34 overlies the panel 10 around the aperture to provide a decorative appearance as well as to form a stop upon insertion of the bezel in the panel from the front face thereof. An arm 40 extending rearwardly from the frame 34 is connected by resilient spaced arm portions 42 to the bottom of the frame and extends generally parallel to the plane of the panel 10 toward the top of the frame as seen in the drawings. The arm portions 42 are interconnected at the top by a transverse member 44. A locking tab 46 is formed by a small projection extending rearwardly from the top part of the frame.

The backup member 32 is of shallow channel form, the channel being just deep enough to receive the fiber optic ribbon 14, which is secured therein, preferably by a transparent adhesive. The upper and lower edges of the backup plate 32 extend forward around the edges of the fiber optic ribbon so that the applique 26 fits flush over the ribbon and the edges of the backup plate. The applique and the backup plate 32 are adhesively secured to each other and are contiguous in their outer periphery. Thus the backup plate carries a lower extension 48. The backup plate is longer than the aperture so that when assembled the ends thereof bear on the rear face of the panel.

To assemble the bezel to the panel, the bezel 30 is inserted through the panel aperture from the front face thereof so that the flange 38 fits against the panel. Then the subassembly comprising the backup plate 32, the fiber optic ribbon 14 and the applique 26, is slidably inserted from the rear of the panel into the space between the panel and the arm 40, the arm being sufficiently resilient to permit the subassembly to slide vertically between the locking tab 46 and the transverse member 44. When the subassembly is in position, the extension 48 fits in the opening defined by the spaced arm portions 42 to prevent lateral sliding of the subassembly from the bezel and the locking tab 46 extends above the backup plate 32 to prevent vertical sliding movement of the subassembly. The resilient arm 40 biases the subassembly against the frame 34.

It will thus be seen that the bezel assembly is easily installed manually without the need for separate fasteners or tools. In addition, the bezel and the backup plate 32 are readily formed by plastic injection molding.

The embodiment of the invention described herein is for purposes of illustration and the scope of the invention is intended to be limited only by the following claims:

I claim:

1. A bezel and backup plate assembly for mounting to a panel having an inner face, an outer face and an aperture extending through the panel from the outer face to the inner face, comprising a bezel insertable into the aperture from the outer face of the panel, the bezel integrally including a frame, an outer flange portion and an arm, the frame being dimensioned to fit within the panel aperture and comprising two spaced side portions, the outer flange portion having dimensions larger than the aperture for engaging the outer face of the panel surrounding the aperture, and the arm connected to one side portion of the frame and projecting beyond the inner panel face and extending transverse of the aperture toward the other side portion of the frame, and means for securing the bezel to the panel comprising a backup plate insertable into the bezel from the inner face of the panel for mounting between the arm and the frame and having at least one dimension larger than the aperture for engaging the inner face of the panel for securing the bezel to the panel.

2. A bezel and backup plate assembly for mounting to a panel having an inner face, an outer face and an aperture extending through the panel from the outer face to the inner face, comprising a bezel insertable into the aperture from the outer face of the panel, the bezel integrally including a frame, an outer flange portion and an arm, the frame being dimensioned to fit within the panel aperture and comprising two spaced side portions, the outer flange portion having dimensions larger than the aperture for engaging the outer face of the panel surrounding the aperture, the arm being resilient and connected to one side portion of the frame and projecting beyond the inner panel face and having a free end extending transverse of the aperture toward the other side portion of the frame, the arm defining an opening adjacent the one side of the frame, and a locking tab projecting from the said other side portion of the frame and slightly spaced from the free end of the arm, and means for securing the bezel to the panel comprising a backup plate slideably insertable into the bezel from the inner face of the panel through the space between the free end of the arm and the locking tab for positioning between the arm and the frame and nested between the locking tab and a portion of the arm connected to the frame for preventing sliding removal in one direction through the said space, an extension on the backup plate extending into the opening in the arm for preventing sliding removal in the other direction, the backup plate having at least one dimension larger than the aperture for engaging the inner face of the panel for securing the bezel to the panel.

3. A bezel and backup plate assembly for mounting an illuminable legend to a panel having an inner face, an outer face and an aperture extending through the panel from the outer face to the inner face, comprising a bezel insertable into the aperture from the outer face of the panel, the bezel integrally including a frame, an outer flange portion and an arm, the frame defining a window being dimensioned to fit within the panel aperture and comprising two spaced side portions, the outer flange portion having dimensions larger than the aperture for engaging the outer face of the panel surrounding the aperture, and the arm connected to one side portion of the frame and projecting beyond the inner panel face and extending transverse of the aperture toward the other side portion of the frame, means for securing the bezel to the panel comprising a backup plate insertable into the bezel from the inner face of the panel and mounted between the arm and the frame and having at least one dimension larger than the aperture for engaging the inner face of the panel for securing the bezel to the panel, and a flat ribbon-like array of remotely energizeable fiber optic filaments secured to the surface of the backup plate facing the window for providing legend illumination, and a translucent legend-bearing applique secured to the backup plate between the frame and the filaments in alignment with the window in the frame.

4. A bezel and backup plate assembly for mounting an illuminable legend to a panel having an inner face, an outer face and an aperture extending through the panel from the outer face to the inner face, comprising a bezel insertable into the aperture from the outer face of the panel, the bezel integrally including a frame defining a window, an outer flange portion and an arm, the frame being dimensioned to fit within the panel aperture and comprising two spaced side portions, the outer flange portion having dimensions larger than the aperture for engaging the outer face of the panel surrounding the aperture, the arm being resilient and connected to one side portion of the frame and projecting beyond the inner panel face and having a free end extending transverse of the aperture toward the other side portion of the frame, the arm defining an opening adjacent the one side of the frame, and a locking tab projecting from the said other side portion of the frame and slightly spaced from the free end of the arm, means for securing the bezel to the panel comprising a backup plate slideably insertable into the bezel from the inner face of the panel through the space between the free end of the arm and the locking tab for positioning between the arm and the frame and nested between the locking tab and a portion of the arm connected to the frame for preventing sliding removal in the other direction the backup plate having at least one dimension larger than the aperture for engaging the inner face of the panel for securing the bezel to the panel, and a flat ribbon-like array of remotely energizeable fiber optic filaments secured to the surface of the backup plate facing the window for providing legend illumination, and a translucent legend-bearing applique secured to the backup plate between the frame and the filaments in alignment with the window in the frame.

* * * * *